(12) United States Patent
Wohlfahrt

(10) Patent No.: US 9,949,444 B2
(45) Date of Patent: Apr. 24, 2018

(54) PRE-VEGETATED VEGETATION ELEMENT

(71) Applicant: XF TECHNOLOGIES B.V., Arnhem (NL)

(72) Inventor: Karl Wohlfahrt, Aschaffenburg (DE)

(73) Assignee: XF Technologies B.V., Arnhem (NL)

( * ) Notice: Subject to any disclaimer, the term of this patent is extended or adjusted under 35 U.S.C. 154(b) by 347 days.

(21) Appl. No.: 14/762,965

(22) PCT Filed: Jan. 21, 2014

(86) PCT No.: PCT/EP2014/051097
§ 371 (c)(1),
(2) Date: Jul. 23, 2015

(87) PCT Pub. No.: WO2014/114626
PCT Pub. Date: Jul. 31, 2014

(65) Prior Publication Data
US 2016/0338270 A1 Nov. 24, 2016

(30) Foreign Application Priority Data

Jan. 23, 2013 (EP) .................................... 13152290

(51) Int. Cl.
A01C 1/04 (2006.01)
A01G 1/00 (2006.01)
A01G 9/02 (2018.01)

(52) U.S. Cl.
CPC ............ A01G 1/005 (2013.01); A01G 9/025 (2013.01); Y02P 60/244 (2015.11)

(58) Field of Classification Search
CPC ......... A01G 1/002; A01G 1/005; A01C 1/044
USPC ........................................................... 47/56
See application file for complete search history.

(56) References Cited

U.S. PATENT DOCUMENTS

| 3,863,388 | A | * | 2/1975 | Loads | A01G 1/002 47/56 |
| 4,786,550 | A | * | 11/1988 | McFarland | A01C 1/044 442/118 |
| 6,219,965 | B1 | | 4/2001 | Ishikawa et al. | |
| 6,242,062 | B1 | * | 6/2001 | de Vries | E01C 13/08 139/391 |
| 2003/0000140 | A1 | * | 1/2003 | Ahm | A01C 1/042 47/56 |
| 2005/0183329 | A1 | * | 8/2005 | Cederblad | B29C 47/0033 47/56 |
| 2005/0217168 | A1 | | 10/2005 | Fujita | |
| 2010/0126066 | A1 | | 5/2010 | DeVos | |
| 2012/0260571 | A1 | | 10/2012 | Behrens | |
| 2013/0004760 | A1 | | 1/2013 | Pellingra | |
| 2014/0250780 | A1 | * | 9/2014 | Lee | D04B 21/10 47/56 |

FOREIGN PATENT DOCUMENTS

| DE | 10 2010 007552 A1 | 8/2011 | |
| EP | 0234285 A1 * | 9/1987 | ............ A01G 1/004 |
| GB | 2 224 191 A | 5/1990 | |
| JP | H08-280245 A | 10/1996 | |
| JP | 2001-333636 A | 12/2001 | |
| JP | 2002-125452 A | 5/2002 | |
| JP | 2002-209460 A | 7/2002 | |
| JP | 2002-256560 A | 9/2002 | |
| JP | 2004-222662 A | 8/2004 | |
| JP | 2012-507614 A | 3/2012 | |
| WO | 85/03842 A1 | 9/1985 | |

OTHER PUBLICATIONS

International Search Report dated Mar. 19, 2014 from International Application No. PCT/EP2014/051097.
International Preliminary Report on Patentability dated Jun. 15, 2015 from International Application No. PCT/EP2014/051097.
Written Opinion of the International Preliminary Search Authority dated Mar. 24, 2015 in International Application No. PCT/EP2014/051097.
Feb. 14, 2017 Office Action issued in Chinese Patent Application No. 201480005693.1.
Oct. 2, 2017 Office Action issued in Japanese Patent Application No. 2015-554126.

* cited by examiner

Primary Examiner — David J Parsley
Assistant Examiner — Danielle A Clerkley
(74) Attorney, Agent, or Firm — Oliff PLC

(57) ABSTRACT

A pre-vegetated vegetation element for greening artificial or natural surfaces is provided which retains sufficient strength over a prolonged period of time and which is bio-compostable at the end of the lifetime of the vegetation element includes a three-dimensional entangled mat of extruded filaments having an open space of at least 50%, a two-dimensional material layer, oriented plane parallel to the three-dimensional entangled mat of extruded filaments and connected to the three-dimensional entangled mat of extruded filaments, wherein the three-dimensional entangled mat of extruded filaments is filled with a substrate and a vegetation is grown on it to form a pre-vegetated vegetation mat, wherein the three-dimensional entangled mat of extruded filaments and the two-dimensional material layer include synthetic polymeric material selected such that the pre-vegetated vegetation element is bio-compostable according to EN 13432.

22 Claims, No Drawings

PRE-VEGETATED VEGETATION ELEMENT

BACKGROUND

Described herein is a pre-vegetated vegetation element for greening of artificial or natural surfaces.

Vegetation elements are used for greening of artificial or natural surfaces such as, for example, roofs of buildings and tramways. Vegetation elements may comprise a vegetation carrier consisting of natural fibers such as coconut. However, the vegetation carrier of natural fibers will rot quickly, generally even before the vegetation has grown sufficiently to the level that the pre-vegetated vegetation element can be harvested and transported to the surface to be greened. Therefore, the use of such vegetation elements comprising a vegetation carrier of natural fibers is therefore limited to applications where the vegetation is allowed to grow at the surface to be greened. However, growing of vegetation requires a considerable amount of care-taking such as, for example, watering and fertilizing, which is preferably performed in a greenery to achieve higher production efficiency. Considerable costs are involved when personnel of the greenery has to visit each separate surface to be greened, such as roofs of high-rise buildings. When the surface to be greened is a tramway, not only high costs are involved for care-taking during growing of the vegetation element, but there is also an increased risk of collision of personnel with a tram.

When the vegetation element is to be applied on an inclined surface, such as, for example, an inclined roof or an inclined wall of a building, the vegetation carrier of natural fibers will lose its mechanical strength due to rotting before the vegetation has grown sufficiently to give some integrity to the vegetation element, and as a consequence, there is high risk that the vegetation element loses its integrity and (part of the) material of the vegetation element will slide down on the inclined surface, or will even fall off the roof or wall of the building.

Vegetation elements may also comprise a vegetation carrier consisting of synthetic fibers such as polyamide-6. However, these vegetation carriers are not bio-compostable, which means that at the end of the lifetime of the vegetation element, the vegetation element has to be disposed of, for example by dumping the vegetation element in a landfill, which is not only expensive, but also a waste of valuable material. Alternatively, the grown vegetation and the substrate may be separated from the vegetation carrier, for example in an additional mechanical process, and be disposed separately, resulting in considerable costs at the end of the lifetime of the vegetation element.

U.S. Pat. No. 6,219,965 B1 discloses a plant growth sheet structure provided with plant protection projections to protect the growing vegetation, the structure being made from polyamide, polypropylene or polyvinyl chloride.

DE 102010007552 A1 discloses a vegetation element comprising a quickly biological degrading film which is already decomposed at the time of harvesting of the pre-vegetated vegetation element.

BRIEF SUMMARY

It is an object of the disclosure to provide a pre-vegetated vegetation element that retains sufficient strength over a prolonged period of time and which is bio-compostable at the end of the lifetime of the vegetation element.

The object of the disclosure is achieved by a pre-vegetated vegetation element for greening artificial or natural surfaces comprising a three-dimensional entangled mat of extruded filaments having an open space of at least 50%, a two-dimensional material layer, oriented plane parallel to the three-dimensional entangled mat of extruded filaments and connected to the three-dimensional entangled mat of extruded filaments, wherein the three-dimensional entangled mat of extruded filaments is filled with a substrate, and a vegetation is grown on it to form a pre-vegetated vegetation mat characterized in that the three-dimensional entangled mat of extruded filaments and the two-dimensional material layer consist essentially of synthetic polymeric material selected such that the pre-vegetated vegetation element is bio-compostable.

DETAILED DESCRIPTION

When the pre-vegetated vegetation element is installed on an inclined surface, the synthetic polymeric material of the three-dimensional entangled mat of extruded filaments and of the two-dimensional material layer in the pre-vegetated vegetation element provides sufficient strength and/or modulus to withstand gravity and/or shear stresses, even after a prolonged period of time.

Preferably, the pre-vegetated vegetation element retains at least 50%, more preferably at least 60%, most preferably at least 75% of its mechanical properties for at least 5 years, more preferably at least 10 years, most preferably for at least 25 years, in particular the breaking strength and/or breaking elongation of the three-dimensional entangled mat of extruded filaments and/or the two-dimensional material layer in connection with the three-dimensional entangled mat of extruded filaments, as determined in accordance to EN-ISO 10319-1996. As the complete vegetation element is bio-compostable, the vegetation element can be transformed into valuable raw material at the end of the lifetime of the pre-vegetated vegetation element, for example after 30 to 50 years.

The three-dimensional entangled mat of extruded filaments may be made of extruded filaments that are randomly laid down on a forming substrate and bonded where they cross. Preferably, the extruded filaments are stretched only by gravity before being laid down on the forming substrate. The filaments may be irregularly looped and intermingled in a highly porous, three-dimensional structure with a large open space. The open space of the three-dimensional entangled mat of extruded filaments, in this context, is defined as the total volume between two planes sandwiching the three-dimensional entangled mat of extruded filaments over a given area, minus the volume occupied by the extruded filaments themselves, as a percentage. The open space may, for example, be at least 50%, preferably at least 75%, more preferably at least 85%, even more preferably at least 90%, even more preferably at least 95%, most preferably at least 98%.

The thickness of the three-dimensional entangled mat of extruded filaments may be varied in wide range of about 2 mm to about 100 mm. Preferably, the thickness of the three-dimensional entangled mat of extruded filaments is in the range of 2 to 30 mm, more preferably in the range of 5 to 20 mm, most preferably in the range of 10 to 20 mm to provide the sufficient space for the substrate.

The thickness, or diameter, of the filaments in the three-dimensional entangled mat of extruded filaments may be in the range of 0.1 to 2.5 mm, preferably in the range of 0.2 to 2.0 mm, more preferably in the range of 0.3 to 1.5 mm, even more preferably in the range of 0.4 to 1.2 mm, most preferably in the range of 0.5 to 0.8 mm. The thickness of the extruded filaments can be used to further adjust to the ease of bio-compostability and the level of mechanical properties remaining in the pre-vegetated vegetation element after a prolonged period of time. With increasing thickness of the extruded filaments, the ease of biodegradability in accordance with EN13432 will be reduced, while the level of mechanical properties remaining in the pre-vegetated vegetation element will be increased. The ease of biodegradability will increase with decreasing thickness of the extruded filaments, while the level of mechanical properties remaining in the pre-vegetated vegetation element will be reduced.

In particular, the combination of the selected synthetic polymeric material and the thickness of the extruded filaments can be used to tune the biodegradability to level of mechanical properties remaining the pre-vegetated vegetation element after a prolonged period of time.

The two-dimensional material layer may comprise a film, a woven fabric, a nonwoven fabric or a knitted fabric. The two-dimensional material layer provides a barrier to prevent the substrate from disappearing from the vegetation element while the vegetation is grown, for example, by erosion due to (heavy) rainfall. The thickness of the two dimensional material is preferably 5 mm or less, more preferably 2 mm or less, most preferably 1 mm or less.

The two-dimensional material layer may be connected to the three-dimensional entangled mat of extruded filaments by any suitable means, such as by mechanical means, such as, for example, by sewing and/or needling, by thermal bonding, such as, for example, hot-air bonding or ultrasonic bonding, and/or by an adhesive, such as, for example, a hot-melt.

The two-dimensional woven fabric, nonwoven fabric or knitted fabric may comprise bicomponent fibers, filaments and/or tapes to enable thermal bonding of the nonwoven fabric to the three-dimensional entangled mat of filaments.

The two-dimensional material layer may be a co-extruded film comprising at least two polymeric components to enable thermal bonding of the film to the three-dimensional entangled mat of filaments.

The construction of the two-dimensional material layer may be such that roots of the vegetation can grow through the two-dimensional material layer to provide increased integrity to the pre-vegetated vegetation element.

The two-dimensional material layer may be integrally formed together with the three-dimensional entangled mat of extruded filaments, wherein part of the extruded filaments form a three-dimensional entangled mat, and a part of the extruded filaments form a two-dimensional material layer, the extruded filaments preferably being bonded where they cross. Such an integral combination of a two-dimensional material layer and a three-dimensional entangled mat of extruded filaments is, for example, available under the Enkamat® Flatback name. The integral combination of a two-dimensional material layer and a three-dimensional entangled mat of extruded filaments may have up to 2700 m of extruded filaments per m² of mat.

The two-dimensional material layer may comprise a multitude of openings, preferably in the range of 50 to 1500 openings per m², to make the vegetation element insensitive to wind suction during installation on the roof, even at great roof heights, as the openings enable an immediate equalization of pressure occurs between the top side and the underside of the vegetation element. The number of openings can be selected as a function of roof height.

The openings in the two-dimensional material layer may have a non-circular cross section, such as, for example, rectangular, having a major dimension defining the largest distance between two opposing sides of the cross section, and a minor dimension defining smallest distance between two opposing sides of the cross section. The minor dimension of the non-circular cross section is preferably in the range of 2 to 20 mm. Non-circular openings may, for example, be introduced in the two-dimensional material layer by a weaving process forming an open-weave or by a punching process.

The openings in the two-dimensional material layer may also have a circular cross section having a diameter preferably in the range of 2 to 20 mm. Circular openings may for example be introduced in the two-dimensional material layer by a punching process or by making holes with hot needles.

The two-dimensional material layer comprising a multitude of openings may be an open weave, a perforated woven fabric, such as a perforated closed weave fabric, a perforated film, a perforated nonwoven fabric or a knitted fabric.

The pre-vegetated preferably does not comprise plant protection projections as disclosed by U.S. Pat. No. 6,219,965 B1. As the vegetation element is pre-vegetated in a controlled location, plant protection projections are not required.

Growing a vegetation on the vegetation element to form a pre-vegetated vegetation element may take a considerable amount of time, for example 9 to 36 months, preferably 9 to 18 months. When the vegetation has grown to a level that at least 50% of the surface of the vegetation element is covered with vegetation, preferably at least 60%, more preferably at least 75%, most preferably at least 90% of the surface of the vegetation element is covered with vegetation, the pre-vegetated vegetation element may be rolled up and transported to the surface to be greened, such as, for example, a roof of a building, the roof being either horizontal or inclined, a wall of a building, the wall being either vertical or inclined, or a tramway. Vegetation grown to a level that at least 50% of the surface of the vegetation element is covered with vegetation fulfils the FLL norms for green roofs.

The vegetation grown on the vegetation element may be any type of lower and/or higher plants. Preferably, the vegetation comprises moss and/or sedum.

The substrate may be any substrate suitable to allow vegetation to grow and may comprise for example sand, small rocks, lava stones and/or fertilizer. The small rocks and/or lava stones preferably have a diameter which enables that the small rocks and/or lava stones fill the gaps between the extruded filaments of the three-dimensional mat of extruded filaments and to provide porosity such that the roots of the growing vegetation can penetrate between the small rocks and/or lava stones. Preferably, the small rocks and/or lava stones have a size in the range of 0 to 8 mm, preferably 0 to 3 mm. Preferably, the substrate comprises lava stones to reduce the weight of the pre-vegetated vegetation element, which reduces the loading on the surface to be greened and simplifies transport and installation of the pre-vegetated vegetation element.

The three-dimensional entangled mat of extruded filaments and the two-dimensional material layer consist essentially of synthetic polymeric material, which means that the three-dimensional entangled mat of extruded filaments and the two-dimensional material layer consist for at least 90 wt. %, preferably for at least 95 wt. %, more preferably at least 98 wt. % of synthetic polymeric material. The three-dimensional entangled mat of extruded filaments and the two-dimensional material layer may temporarily be exposed to ultraviolet (UV-A and/or UV-B) radiation until the vegetation has covered the surface of the vegetation element. Therefore, the three-dimensional entangled mat of extruded filaments and the two-dimensional material layer may comprise additives such as for example UV-stabilisers, crystallization promoters and/or processing aids.

The synthetic polymeric material is selected such that the vegetation element is bio-compostable at the end of the lifetime of the pre-vegetated vegetation element. The synthetic polymeric material may comprise a polymer made by a polycondensation reaction of hydroxylcarboxylic acids or a ring opening polymerization of lactides. Preferred synthetic polymeric materials comprise polymer(s) of $\alpha$-, $\beta$-, $\gamma$-, $\delta$-, or $\epsilon$-hydroxylesters.

Preferably, the synthetic polymeric material of which the three-dimensional entangled mat of extruded filaments is made is selected to comprise polymer(s) from the group of polyhydroxyalkanoates (PHAs), such as for example polyhydroxybutyrate (PHB), polyhydroxyvalerate (PHV), poly-(3-hydroxybutyrateco-3-hydroxyvalerate) PHVB or polyhydroxyhexanoate (PHH) as, for example, available from Metabolix under the Mirel brand name, polylactic acid (PLA), polyglycolic acid (PGA), polycaprolactone (PCL), poly-$\beta$-butyrolactone (PBL), polybutylene succinate (PBS), cellulose derivates and/or blends thereof. In a preferred embodiment, the synthetic polymeric material of which the three-dimensional entangled mat of extruded filaments is made is polylactic acid (PLA).

Preferably, also the synthetic polymeric material of which the two-dimensional material layer is made is selected to comprise polymer(s) from the group of polyhydroxyalkanoates (PHAs), such as, for example, polyhydroxybutyrate (PHB), polyhydroxyvalerate (PHV), poly-(3-hydroxybutyrateco-3-hydroxyvalerate) PHVB or polyhydroxyhexanoate (PHH), polylactic acid (PLA), polyglycolic acid (PGA), polycaprolactone (PCL), poly-$\beta$-butyrolactone (PBL), polybutylene succinate (PBS), cellulose derivates and/or blends thereof. In a preferred embodiment, the synthetic polymeric material of which the two-dimensional material layer is made is polylactic acid (PLA).

A synthetic polymeric material provides improved control over product properties as compared with natural materials, whose properties vary greatly under environmental influences, such as, for example, temperature, humidity and/or wind.

Although the synthetic polymeric material may be made from oil-based raw materials, the synthetic polymeric material is preferably made from bio-based and/or renewable raw materials for improved sustainability.

Bio-compostability of the pre-vegetated vegetation element is, in this context, defined as fulfilling the requirements of the norm EN 13432. Norm EN 13432 defines that the vegetation element has to be biodegraded for at least 90% into carbon-dioxide ($CO_2$), water and minerals and new cell biomass within 6 months in an industrial composting unit, at a temperature of 60° C. and at 100% relative humidity.

In embodiments, the two-dimensional material layer may be a water retention layer capable of storing a sufficient amount of water to support growth of the vegetation. The roots of the growing vegetation may grow into or through the water retention layer. Preferably, the water retention layer is capable of storing at least 25 wt. % of water based on the dry weight of the water retention layer, more preferably at least 50 wt. %, even more preferably at least 75 wt. %, most preferably at least 100 wt. %.

Preferably, the water retention layer is a nonwoven fabric, more preferably a nonwoven fabric comprising staple fibers. The weight of the nonwoven fabric may vary, but preferably the weight of the water retention layer is 500 $g/m^2$ or less, more preferably 300 $g/m^2$ or less, most preferably 200 $g/m^2$ or less to further improve the bio-compostability of the pre-vegetated vegetation element. Preferably, the fibers in the nonwoven fabric have a diameter of 250 µm or less, more preferably 100 µm or less, even more preferably 75 µm or less, most preferably 50 µm or less to further improve the bio-compostability of the pre-vegetated vegetation element.

The water retention layer may consist essentially of synthetic polymeric material. Preferably, the synthetic polymeric material of which the water retention layer is made is selected to comprise polymer(s) from the group of polyhydroxyalkanoates (PHAs), such as, for example, polyhydroxybutyrate (PHB), polyhydroxyvalerate (PHV), poly-(3-hydroxybutyrateco-3-hydroxyvalerate) PHVB or polyhydroxyhexanoate (PHH), polylactic acid (PLA), polyglycolic acid (PGA), polycaprolactone (PCL), poly-$\beta$-butyrolactone (PBL), polybutylene succinate (PBS), cellulose derivates and/or blends thereof. In a preferred embodiment, the synthetic polymeric material of which the water retention layer is made is polylactic acid (PLA).

The pre-vegetated vegetation element may further comprise a drainage layer of any known type oriented plane parallel to the two-dimensional material layer to drain excess amount of water, such as, for example, during rainfall or during watering of the vegetation element.

The drainage layer preferably comprises a further three-dimensional entangled mat of extruded filaments as described above to provide sufficient drainage capacity.

The drainage layer may be connected to the two-dimensional material layer in any known manner, such as by mechanical means, such as, for example, by sewing and/or needling, by thermal bonding, such as, for example, hot-air bonding or ultrasonic bonding, and/or by an adhesive, such as, for example a hot-melt.

The drainage layer preferably comprises a filter layer facing the two-dimensional material layer to prevent that too much solid material enters into the drainage layer in order to ensure that the drainage capacity of the drainage layer remains sufficient during the lifetime of the pre-vegetated vegetation mat.

The filter layer may consist essentially of synthetic polymeric material. Preferably, the synthetic polymeric material of which the filter layer is made is selected to comprise polymer(s) from the group of polyhydroxyalkanoates (PHAs), such as, for example, polyhydroxybutyrate (PHB), polyhydroxyvalerate (PHV), poly-(3-hydroxybutyrateco-3-hydroxyvalerate) PHVB or polyhydroxyhexanoate (PHH), polylactic acid (PLA), polyglycolic acid (PGA), polycaprolactone (PCL), poly-$\beta$-butyrolactone (PBL), polybutylene succinate (PBS), cellulose derivates and/or blends thereof. In a preferred embodiment, the synthetic polymeric material of which the filter layer is made is polylactic acid (PLA).

The drainage layer may comprise a further two-dimensional material layer located on the opposite side of the filter layer. The further two-dimensional material layer may be a waterproof layer or a water permeable layer depending on the type of surface on which the pre-vegetated vegetation element is to be installed.

The drainage layer may consist essentially of synthetic polymeric material. Preferably, the synthetic polymeric material of the drainage layer is selected such that the drainage layer is also bio-compostable at the end of the lifetime of the pre-vegetated vegetation element, so that the complete pre-vegetated vegetation element including the drainage layer can be composted at the end of the lifetime of the pre-vegetated vegetation element. Preferably, the synthetic polymeric material of the drainage layer is selected such that the drainage layer does not start to degrade during the life-time of the pre-vegetated vegetation mat.

Preferably, the synthetic polymeric material of which each of the components of the drainage layer is made is selected to comprise polymer(s) from the group of polyhydroxyalkanoates (PHAs), such as, for example, polyhydroxybutyrate (PHB), polyhydroxyvalerate (PHV), poly-(3-hydroxybutyrateco-3-hydroxyvalerate) PHVB or polyhydroxyhexanoate (PHH), polylactic acid (PLA), polyglycolic acid (PGA), polycaprolactone (PCL), poly-β-butyrolactone (PBL), polybutylene succinate (PBS), cellulose derivates and/or blends thereof. In a preferred embodiment, the synthetic polymeric material of which components of the drainage layer is made is polylactic acid (PLA).

The pre-vegetated vegetation element may optionally be connected to a pressure sensitive adhesive for easy installation on, and adhesion to, the surface to be greened.

In an embodiment, the pre-vegetated vegetation element comprises a three-dimensional entangled mat of extruded filaments having an open space of at least 50%, a two-dimensional material layer, oriented plane parallel to the three-dimensional entangled mat of extruded filaments, and connected to the three-dimensional entangled mat of extruded filaments, a drainage layer comprising a filter layer facing the two-dimensional material layer and optionally a further two-dimensional material layer located on the opposite side of the filter layer, wherein the two-dimensional material layer is a water retention layer, wherein the water retention layer is a nonwoven fabric, wherein the three-dimensional entangled mat of extruded filaments is filled with a substrate and a vegetation is grown on it to form a pre-vegetated vegetation mat and the three-dimensional entangled mat of extruded filaments, the two-dimensional material layer and the drainage layer consist essentially of synthetic polymeric material selected such that the pre-vegetated vegetation element is bio-compostable.

Example 1

A three-dimensional entangled mat of extruded filaments made of polylactic acid, type 6202D as available from NatureWorks, was made by extruding filaments and randomly laying down the extruded filaments on a forming surface. The filaments had a diameter in the range of 0.4 to 0.6 mm were bonded to each other where they crossed. The three-dimensional entangled mat of extruded filaments had a weight of 270 g/m$^2$ and a thickness of 10 mm.

A two-dimensional staple fiber nonwoven fabric, made of polylactic acid, available from De Sadeleir, was oriented plane parallel to the three-dimensional entangled mat of extruded filaments. The nonwoven fabric had a weight of 168 g/m$^2$ and a thickness of 1.0 mm.

The two-dimensional staple fiber nonwoven fabric was connected to the three-dimensional entangled mat of extruded filaments by thermal bonding by bringing the two-dimensional nonwoven fabric in contact with the three-dimensional entangled mat of extruded filaments while the extruded filaments were still hot. The combined structure had a thickness of 9.6 mm.

The combined structure was subsequently filled with a substrate and vegetation was grown to obtain a pre-vegetated vegetation element. The pre-vegetated vegetation element is capable of retaining at least 50% of its mechanical properties after at least 5 years.

Example 2

A three-dimensional entangled mat of extruded filaments was provided as in example 1.

A two-dimensional nonwoven fabric, made of polylactic acid, available from Unitika—type L0503WTO, was oriented plane parallel to the three-dimensional entangled mat of extruded filaments. The nonwoven fabric had a weight of 50 g/m$^2$.

The two-dimensional staple fiber nonwoven fabric was connected to the three-dimensional entangled mat of extruded filaments by thermal bonding by bringing the two-dimensional nonwoven fabric in contact with the three-dimensional entangled mat of extruded filaments while the extruded filaments were still hot.

The combined structure was subsequently filled with a substrate and vegetation was grown to obtain a pre-vegetated vegetation element. The pre-vegetated vegetation element is capable of retaining at least 50% of its mechanical properties after at least 5 years.

What is claimed is:

1. A pre-vegetated vegetation element for greening artificial or natural surfaces comprising:
    a three-dimensional entangled mat of extruded filaments having an open space of at least 50%,
    a two-dimensional material layer, oriented plane parallel to the three-dimensional entangled mat of extruded filaments and connected to the three-dimensional entangled mat of extruded filaments, wherein
        the three-dimensional entangled mat of extruded filaments is filled with a substrate and a vegetation is grown on the substrate to form a pre-vegetated vegetation mat,
        the three-dimensional entangled mat of extruded filaments and the two-dimensional material layer comprise synthetic polymeric material, and
        the pre-vegetated vegetation element is bio-compostable such that the vegetation element is capable of being 90% biodegraded into carbon dioxide ($CO_2$), water and minerals and new cell biomass within 6 months in an industrial composting unit at a temperature of 60° C. and at 100% relative humidity.

2. The pre-vegetated vegetation element according to claim 1, wherein the pre-vegetated vegetation element retains at least 50% of its mechanical properties for at least 5 years.

3. The pre-vegetated vegetation element according to claim 1, wherein the two-dimensional material layer comprises a film, a woven fabric, a nonwoven fabric or a knitted fabric.

4. The pre-vegetated vegetation element according to claim 1, wherein the two-dimensional material layer is a perforated two-dimensional material layer.

5. The pre-vegetated vegetation element according to claim 1, wherein the two-dimensional material layer is a water retention layer.

6. The pre-vegetated vegetation element according to claim 1, wherein the synthetic polymeric material is selected from the group consisting of polyhydroxyalkanoates (PHAs), polylactic acid (PLA), polyglycolic acid (PGA), polycaprolactone (PCL), poly-β-butyrolactone (PBL), polybutylene succinate (PBS), cellulose derivates and blends thereof.

7. The pre-vegetated vegetation element according to claim 1, wherein the two-dimensional material layer is a woven fabric, nonwoven fabric or knitted fabric comprising bicomponent fibers, filaments and/or tapes.

8. The pre-vegetated vegetation element according to claim 1, wherein the two-dimensional material layer is a co-extruded film comprising at least two polymeric components.

9. The pre-vegetated vegetation element according to claim 1, wherein the vegetation comprises moss and/or sedum.

10. The pre-vegetated vegetation element according to claim 1, wherein pre-vegetated vegetation element comprises a drainage layer oriented plane parallel to the two-dimensional material layer.

11. The pre-vegetated vegetation element according to claim 10, wherein the drainage layer is a further three-dimensional entangled mat of extruded filaments.

12. The pre-vegetated vegetation element according to claim 10, wherein the drainage layer is comprised of synthetic polymeric material.

13. The pre-vegetated vegetation element according to claim 1, wherein the pre-vegetated vegetation element is connected to a pressure sensitive adhesive.

14. The pre-vegetated vegetation element according to claim 11, wherein the pre-vegetated vegetation element comprises a water retention layer, and the drainage layer comprises a filter layer facing the two-dimensional material layer and optionally a further two-dimensional material layer located on the opposite side of the filter layer, wherein the water retention layer is a nonwoven fabric, and the further three-dimensional entangled mat of extruded filaments, the water retention layer and the drainage layer are comprised of synthetic polymeric material.

15. The pre-vegetated vegetation element according to claim 1, wherein the three-dimensional entangled mat of extruded filaments and the two-dimensional material layer consist essentially of synthetic polymeric material.

16. The pre-vegetated vegetation element according to claim 4, wherein the two-dimensional material layer has 50 to 1500 openings per $m^2$.

17. The pre-vegetated vegetation element according to claim 6, wherein the synthetic polymeric material is a polyhydroxyalkanoate selected from the group consisting of polyhydroxybutyrate (PHB), polyhydroxyvalerate (PHV), poly-(3-hydroxybutyrateco-3-hydroxyvalerate) PHVB and polyhydroxyhexanoate (PHH).

18. The pre-vegetated vegetation element according to claim 14, wherein the further three-dimensional entangled mat of extruded filaments, the water retention layer and the drainage layer consist essentially of synthetic polymeric material.

19. The pre-vegetated vegetation element according to claim 1, wherein the pre-vegetated vegetation element does not comprise plant protection projections.

20. The pre-vegetated vegetation element according to claim 1, wherein the pre-vegetated vegetation element retains at least 60% of its mechanical properties for at least 5 years.

21. A pre-vegetated vegetation element for greening artificial or natural surfaces comprising:
a three-dimensional entangled mat of extruded filaments having an open space of at least 50%,
a two-dimensional material layer, oriented plane parallel to the three-dimensional entangled mat of extruded filaments and connected to the three-dimensional entangled mat of extruded filaments, wherein
the three-dimensional entangled mat of extruded filaments is filled with a substrate and a vegetation is grown on the substrate to form a pre-vegetated vegetation mat, and
the three-dimensional entangled mat of extruded filaments and the two-dimensional material layer comprise synthetic polymeric material that is bio-compostable such that the vegetation element is capable of being 90% biodegraded into carbon dioxide ($CO_2$), water and minerals and new cell biomass within 6 months in an industrial composting unit at a temperature of 60° C. and at 100% relative humidity.

22. A carrier for vegetation comprising:
a three-dimensional entangled mat of extruded filaments having an open space of at least 50%,
a two-dimensional material layer, oriented plane parallel to the three-dimensional entangled mat of extruded filaments and connected to the three-dimensional entangled mat of extruded filaments, wherein
the three-dimensional entangled mat of extruded filaments and the two-dimensional material layer comprise synthetic polymeric material, and
the synthetic polymeric material is bio-compostable such that the carrier for vegetation is capable of being 90% biodegraded into carbon dioxide ($CO_2$), water and minerals and new cell biomass within 6 months in an industrial composting unit at a temperature of 60° C. and at 100% relative humidity.

* * * * *